(12) United States Patent
Yoshioka

(10) Patent No.: US 6,272,318 B1
(45) Date of Patent: Aug. 7, 2001

(54) PAGER CAPABLE OF AUTOMATICALLY SWITCHING AND SETTING A PLURALITY OF TRANSMISSION SPEEDS

(75) Inventor: Kenji Yoshioka, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/090,016

(22) Filed: Jun. 3, 1998

(30) Foreign Application Priority Data

Jun. 5, 1997 (JP) .................................................. 9-148216

(51) Int. Cl.[7] ...................................................... H04B 1/00
(52) U.S. Cl. .................................. 455/31.2; 340/825.44; 370/465; 375/225
(58) Field of Search ...................... 455/31.2, 343, 455/161.2, 38.4, 115, 466, 38.1, 38.3, 552, 31.1; 340/825.44, 825.45, 825.46; 375/225, 316, 377; 370/465

(56) References Cited

U.S. PATENT DOCUMENTS

| | | | |
|---|---|---|---|
| 4,816,820 | * 3/1989 | Davis | 340/825.44 |
| 5,049,875 | * 9/1991 | DeLuca et al. | 340/825.44 |
| 5,122,795 | * 6/1992 | Cubley | 455/31.2 |
| 5,187,471 | * 2/1993 | Wagai et al. | 455/343 |
| 5,247,700 | * 9/1993 | Wohl et al. | 455/552 |
| 5,689,440 | * 11/1997 | Leitch et al. | 455/31.2 |
| 5,701,598 | * 12/1997 | Atkinson | 455/161.2 |
| 5,982,837 | * 11/1999 | Earnest | 375/377 |
| 5,995,808 | * 11/1999 | Hasegawa | 455/38.4 |
| 5,995,813 | * 11/1999 | Oshikura et al. | 455/115 |
| 5,995,963 | * 9/1999 | Ono | 455/38.4 |
| 6,011,955 | * 1/2000 | Tsuchiyama | 455/38.4 |

FOREIGN PATENT DOCUMENTS

| | | |
|---|---|---|
| 62-66730 | 3/1987 | (JP) . |
| 1-246931 | 10/1989 | (JP) . |
| 2-53635 | 4/1990 | (JP) . |
| 714181 | 6/1995 | (JP) . |
| 8-275220 | 10/1996 | (JP) . |
| 782355 | 12/1996 | (JP) . |
| 10-313468 | 11/1998 | (JP) . |
| 95-35220 | 12/1995 | (KR) . |
| 88 03349 | 5/1988 | (WO) . |
| 91 00655 | 1/1991 | (WO) . |
| 97 24828 | 7/1997 | (WO) . |

OTHER PUBLICATIONS

Japanese translation of Korean Office Action issued May 30, 2000 in a related application.
English translation of relevant portions.
Japanese Office Action issued Aug. 31, 1999 in a related application.
English translation of relevant portions of Aug. 31, 1999 Japanese Office Action.

* cited by examiner

Primary Examiner—Lester G. Kincaid
(74) Attorney, Agent, or Firm—Ostrolenk, Faber, Gerb & Soffen, LLP

(57) ABSTRACT

In a pager, one of a plurality of kinds of baud rates is automatically selected for each of the service areas or network providers. With this provision, the conventional operation to produce pagers for the respective transmission speeds becomes unnecessary, which resultantly improves productivity as well as operability and usability thereof. The pager includes an antenna, a radio section, a demodulating section, a low-pass filter, a comparator, a decoder, a CPU, a notifying section, a ROM, a RAM, and a switching circuit. Receiving a broadcast radio wave, the pager produces a demodulated signal therefrom. In accordance with the demodulated signal, the pager automatically sets operation of the decoder to either one of a plurality of transmission speeds of the received signal and conducts a paging operation when a paging number of the received signal matches a paging number beforehand stored therein.

19 Claims, 10 Drawing Sheets

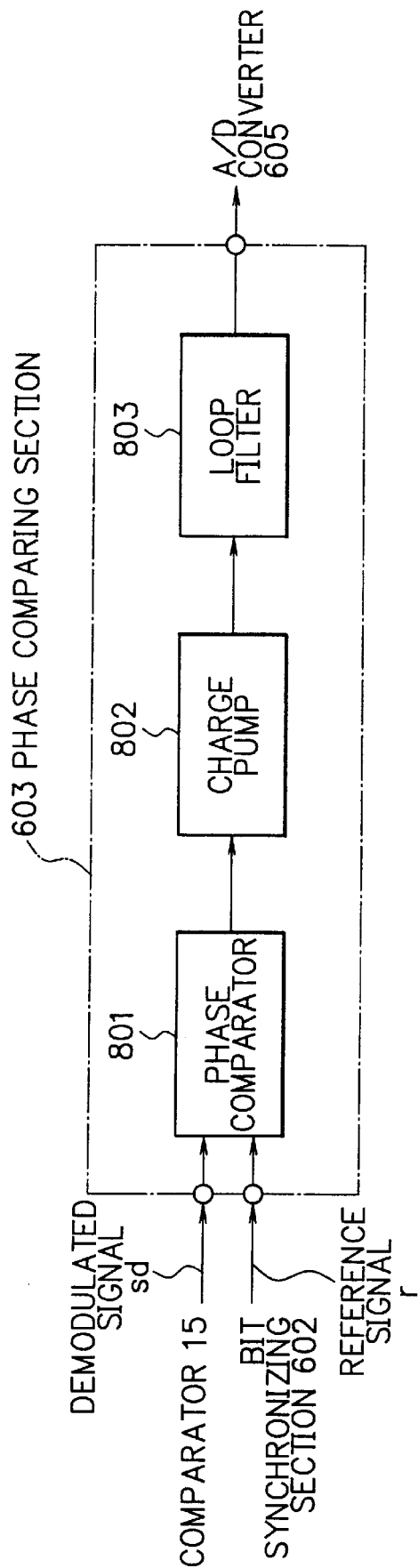
F I G. 4

F I G. 10
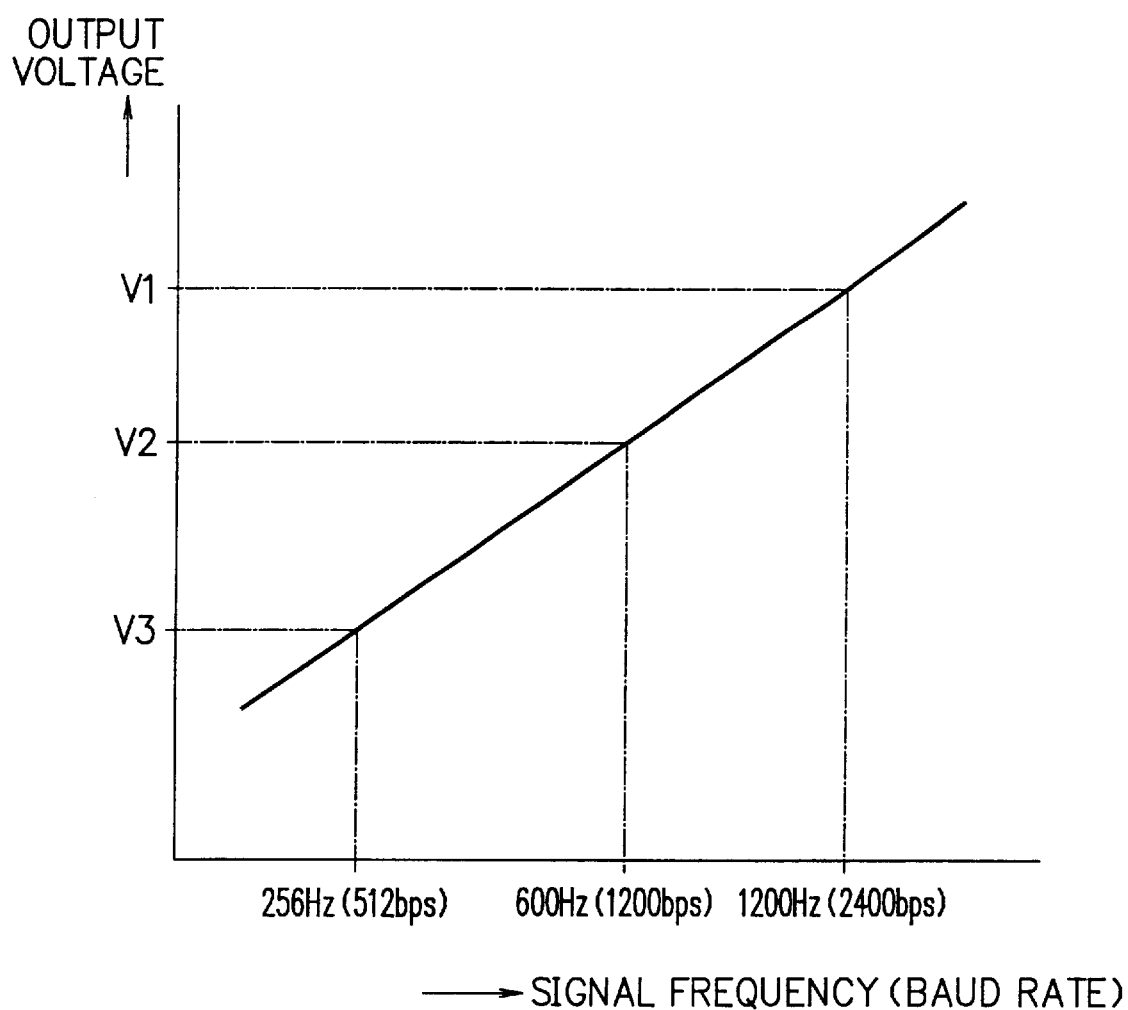

PAGER CAPABLE OF AUTOMATICALLY SWITCHING AND SETTING A PLURALITY OF TRANSMISSION SPEEDS

BACKGROUND OF THE INVENTION

The present invention relates to a pager of the POCSAG system, and in particular, to a pager capable of setting a plurality of transmission speeds through a change-over operation in an automatic fashion.

DESCRIPTION OF THE RELATED ART

Heretofore, in the pagers operating in the POCSAG system, the transmission speed (to be referred to as baud rate herebelow) is limited to either one of 512, 1200, and 2400 bits per second (bps; these baud rates will be referred to respectively as Abps, Bbps, and Cbps herebelow). Namely, the speed varies between service areas and network managing firms or network providers.

Therefore, one of the baud rates, i.e., Abps, Bbps, or Cbps is beforehand set in the pagers of the POCSAG system. In the following description, "baud rate (Abps, Bbps, Cbps)" indicates that either one thereof is to be used.

Specifically, the clock signal is set in association with the baud rate (Abps, Bbps, Cbps);

Moreover, the band of the low-pass filter (LPF) is accordingly changed or there is disposed a low-pass filter dedicated to the band.

In the pager of this type, an integrated circuit for demodulation and detection of signals in a radio section thereof includes a bit-rate low-pass filter to cope with each of the baud rates Abps, Bbps, and Cbps.

However, the decoder in the pager is adjusted to cope only with Abps, Bbps, or Cbps beforehand set as above.

Consequently, the conventional pager of the POCSAG system has been used only with one baud rate Abps, Bbps, or Cbps.

In the pager above, a broadcast radio wave received by an antenna such that the received signal is amplified by a radio section. The signal is subjected to a mixing operation and a frequency conversion. A band limiting operation is conducted for the obtained signal to limit a band thereof to resultantly attain a target intermediate frequency (IF) signal. The signal is demodulated by a demodulating section into a base band signal to be sent to a low-pass filter (LPF) to remove noise components therefrom. Additionally, the filter is adjusted to have a cutoff frequency corresponding to the baud rate Abps, Bbps, or Cbps of the POCSAG system to thereby accomplish the band limiting operation of the input signal. Furthermore, the base band signal is transformed by a comparator into a digital signal and is then collated with a selective call number (paging signal) beforehand stored therein. Notification of the results of the collation is carried out by operations of a central processing unit and a decoder.

FIG. 1 shows in a block diagram a configuration of a conventional decoder.

The decoder includes a reference signal generator 1 including a crystal oscillator Xtal to produce a clock signal. The clock signal and a digital base signal are fed to a bit synchronizing section 2. The section 2 divides the input signal in accordance with the baud rate Abps, Bbps, or Cbps of the POCSAG system to generate a baud rate indication signal, i.e., a baud rate clock signal and then sends the signal to a signal processing section 3. In accordance with the baud rate indication signal, the processing section 3 executes processing for the digital base band signal, i.e., the received signal. In short, the section conducts such operations as the collation between the paging number (signal) and a paging number beforehand stored in a read-only memory (ROM) and an operation to activate a notifying section.

As above, in the conventional pager, it is impossible to automatically select a baud rate for each of the service areas or the network providers. In other words, it is required to produce a pager set to each of the desired baud rates, which leads to a drawback of reduction in productivity of the pagers.

Furthermore, when the service area or the network provider in a service area is changed or when the baud rate is altered depending on the time zones, the baud rate of the pager is required to be readjusted, which results in deterioration in operability of the pager.

SUMMARY OF THE INVENTION

It is therefore an object of the present invention, which has been devised to remove the problems of the prior art, to provide a pager capable of automatically selecting one of a plurality of different transmission speeds for each of the service areas or the network providers, which removes necessity of the production of pagers for the respective transmission speeds to thereby improve productivity of the pagers. Moreover, thanks to the pager, it becomes unnecessary to readjust the transmission speed even when the service area or the network provider in a service area is altered, which advantageously improves operability and usability of the pager.

To achieve the object above in accordance with a first aspect of the present invention, there is provided a pager for receiving a broadcast radio wave transmitted at one of a plurality of baud rates and automatically setting an operation mode thereof for a paging operation at the baud rate of the received signal. The pager is configured to include reception processing means for receiving the broadcast radio wave and producing a demodulated signal therefrom and automatic paging operation setting means for automatically setting an operation mode thereof for an operation at any one of a plurality of baud rates in accordance with the demodulated signal produced from the reception processing means and conducting a paging operation when a received paging number matches a selective paging number beforehand stored therein.

In accordance with a second aspect of the present invention, the automatic paging operation setting means conducts a voltage conversion for the received baud rates and automatically sets the operation mode, when a voltage resultant from the conversion is within a predetermined voltage range respectively corresponding to a plurality of predetermined baud rates, to an operation at the baud rate of the received signal.

In accordance with a third aspect of the present invention, the automatic paging operation setting means conducts, in association with the automatic setting of the operation mode to the operation at the baud rate of the received signal, a band limitation for the received signal of the reception processing means in accordance with the baud rate.

In accordance with a fourth aspect of the present invention, the reception processing means and automatic paging operation setting means include a radio section for amplifying a received signal obtained by receiving the broadcast radio wave and converting the signal into an intermediate frequency signal therefrom, a demodulating section for demodulating the intermediate frequency signal from the radio section, a low-pass filter for receiving as an input thereto a demodulated base band signal from the demodulating section and having a cutoff frequency set to a value corresponding to one of a plurality of baud rates in response to a switching signal, a comparator for converting the base band signal from the low-pass filter into a digital signal, a notifying section for notifying a signal reception, a decoder for receiving as an input thereto the digital base band signal from the comparator, correlating a received pre-stored paging number with a paging number activating the notifying section, and transmitting a switching signal to change the cutoff frequency of the low-pass filter, and a storage section for storing therein the paging number unique to the pager.

In accordance with a fifth aspect of the present invention, the decoder includes a reference signal generator for generating a clock signal as a reference of operation, a bit synchronizing section for outputting a baud rate indication signal corresponding to one of the plural of transmission baud rates, a phase comparing section for comparing a phase of the demodulated signal with a phase of the baud rate indication signal from the bit synchronizing section and transmitting an output voltage corresponding to the baud rate of the received signal, an analog-to-digital (A/D) converter for converting the output voltage from the phase comparing section into a digital signal, a decision circuit for comparing the output voltage in the form of a digital signal from the A/D converter with a predetermined decision voltage and thereby outputting a setting signal corresponding to the baud rate of the received signal, a selector for selectively outputting a baud rate indication signal from the bit synchronizing section in response to the setting signal produced from the decision circuit in correspondence with the transmission speed of the received signal, and a signal processing section for correlating, in response to the baud rate indication signal from the selector, a received paging number with a paging number beforehand stored therein, activating the notifying section, and transmitting a switching signal to change the cutoff frequency of the low-pass filter.

In accordance with a sixth aspect of the present invention, the decoder includes, a frequency discriminator for transmitting the demodulated signal as an output voltage corresponding to a transmission speed set by a transmission side, a comparator for comparing the output voltage from the frequency discriminator with decision voltages and outputting a setting signal corresponding to the baud rate set by the transmission side, a selector for selectively outputting a baud rate indication signal from the bit synchronizing section in response to the setting signal produced from the comparator in correspondence with the transmission speed of the received signal, and a signal processing section for correlating, in response to the baud rate indication signal from the selector, a received paging number with a paging number beforehand stored therein, activating the notifying section, and transmitting a switching signal to change the cutoff frequency of the low-pass filter.

In accordance with a seventh aspect of the present invention, the phase comparing section includes a comparator for comparing a phase of the demodulated signal with a phase of the baud rate indication signal and transmitting an output voltage corresponding to the baud rate of the received signal, a charge pump for keeping therein the output voltage produced from the comparator in correspondence with the transmission speed and transmitting the output voltage therefrom, and a loop filter for removing noise components from the output voltage from the charge pump and outputting the obtained signal therefrom.

In accordance with an eighth aspect of the present invention, the low-pass filter includes, a first transistor switching circuit for grounding, in response to a switching signal, a capacitor setting in combination with a resistor the cutoff frequency of the low-pass filter to a first cutoff frequency corresponding to a first baud rate, a second transistor switching circuit for grounding, in response to a switching signal, a capacitor setting in combination with the resistor the cutoff frequency of the low-pass filter to a second cutoff frequency corresponding to a second baud rate and a third transistor switching circuit for grounding, in response to a switching signal, a capacitor setting in combination with the resistor the cutoff frequency of the low-pass filter to a third cutoff frequency corresponding to a third baud rate.

In accordance with a ninth aspect of the present invention, there is provided a pager including a pager in accordance with the first aspect of the invention being operated in conformity with the POCSAG system.

The pager configured as above in accordance with the present invention automatically sets, on receiving a broadcast radio wave transmitted at one of a plurality of baud rates, its paging operation in accordance with the baud rates of the received signal. Resultantly, it is possible to automatically select any one of plural baud rates for each service area or network provider. Therefore, the operation to produce pagers for the respective baud rates becomes unnecessary, which leads to improvement of productivity of the pagers. Additionally, even when the service area or the network provider in a service area is changed, it is not required to readjust the related pagers for the associated baud rates, which results in improvement of usability and operability of the pagers.

Particularly, in the pager in accordance with the sixth aspect of the present invention, in association with the baud rates set by the transmission side, the output voltage is generated through a frequency discrimination. Furthermore, the output voltage is compared with decision voltages to produce a setting signal associated with the transmission speed. In consequence, the configuration of the system is simplified when compared with a case in which the operation above is carried out in a digital signal processing.

BRIEF DESCRIPTION OF THE DRAWINGS

The objects and features of the present invention will become more apparent from the consideration of the following detailed description taken in conjunction with the accompanying drawings in which:

FIG. 4 is a detailed block diagram showing constitution of a phase comparing section of the decoder;

FIG. 10 is a graph for explaining an output voltage in the operation of the decoder in accordance with the present invention;

DESCRIPTION OF THE PREFERRED EMBODIMENTS

Referring next to the accompanying drawings, description will be given in detail of a first embodiment of the pager in accordance with the present invention.

Figure 1:
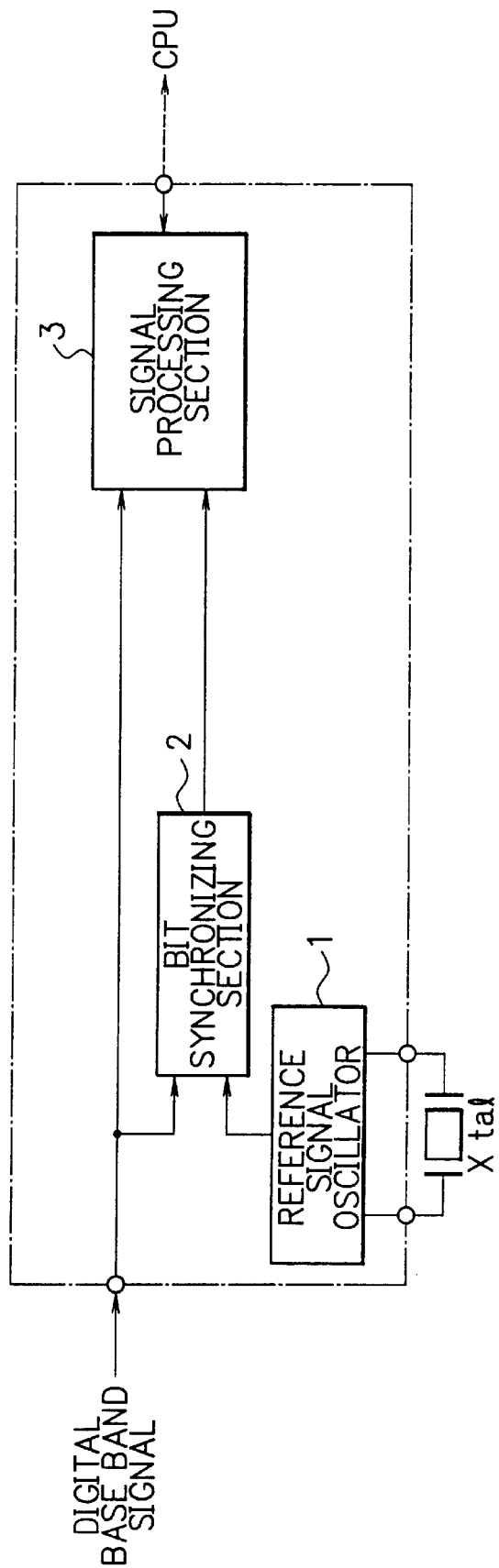
FIG. 1 is a block diagram schematically showing constitution of a conventional decoder.
Figure 2:
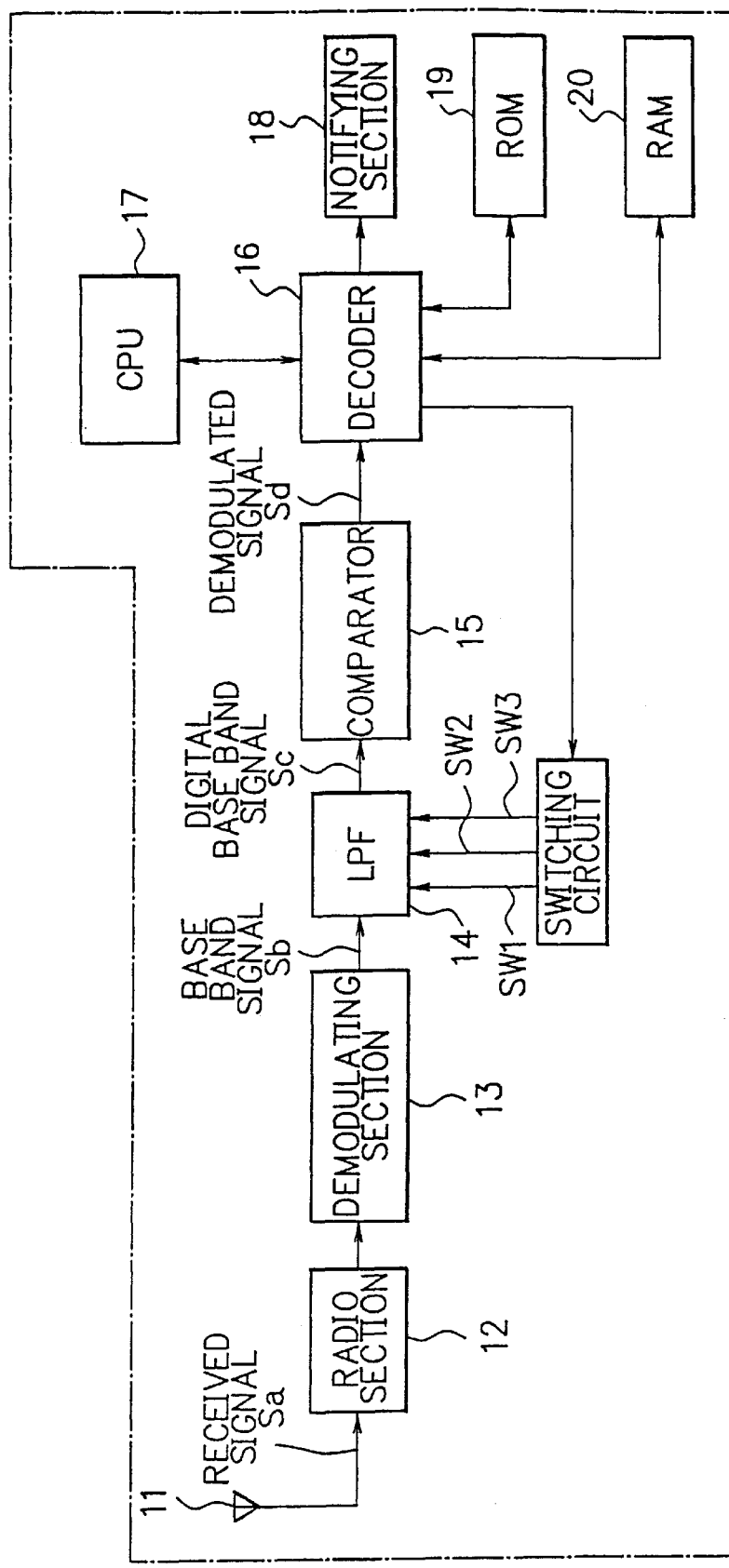
FIG. 2 is a schematic block diagram showing an overall configuration of a first embodiment of the pager in accordance with the present invention.

FIG. 2 shows in a block diagram the overall configuration of the first embodiment of the pager in accordance with the present invention.

The pager includes an antenna 11 to receive a broadcast radio wave to produce a received signal Sa, a radio section 12 which amplifies the signal Sa, conducts a frequency conversion through a mixing operation for the amplified signal, and limits a band of the signal to produce an intermediate frequency (IF) signal, and a demodulating section 13 to demodulate the intermediate frequency signal from the radio section 12 to create a base band signal Sb.

Additionally, the pager includes a low-pass filter (LPF) 14 which receives the base band signal Sb from the demodulating section 13 and which has a selectable cutoff frequency, for example, respectively corresponding to baud rates of 512 bps, 1200 bps, and 2400 bps of the POCSAG system, set in response to a switching signal SW1, SW2, or SW3 inputted thereto, a comparator 15 to transform the base band signal from the filter 14 into a digital signal, a decoder 16 which correlates a received paging number (signal) with a paging number pre-stored in a ROM 19, energizes a notifying section 18, and controls the switching operation of the filter 14, and a CPU 17 to accomplish various control operations in cooperation with the decoder 16.

In addition, the pager includes a notifying section 18 to notify a message of signal reception to the user, for example, by intermittently sounding a tone or vibrating the pager, a ROM 19 to store therein the paging number unique to the pager, a random access memory (RAM) 20 to temporarily store therein various setting information, and a switching circuit 21 to output therefrom switching signals SW1 to SW2 in response to a control signal from the decoder 16 to set (change) the cutoff frequency of the filter 14 corresponding to, for example, baud rates Abps, Bbps, and Cbps of the POCSAG system.

Figure 3:
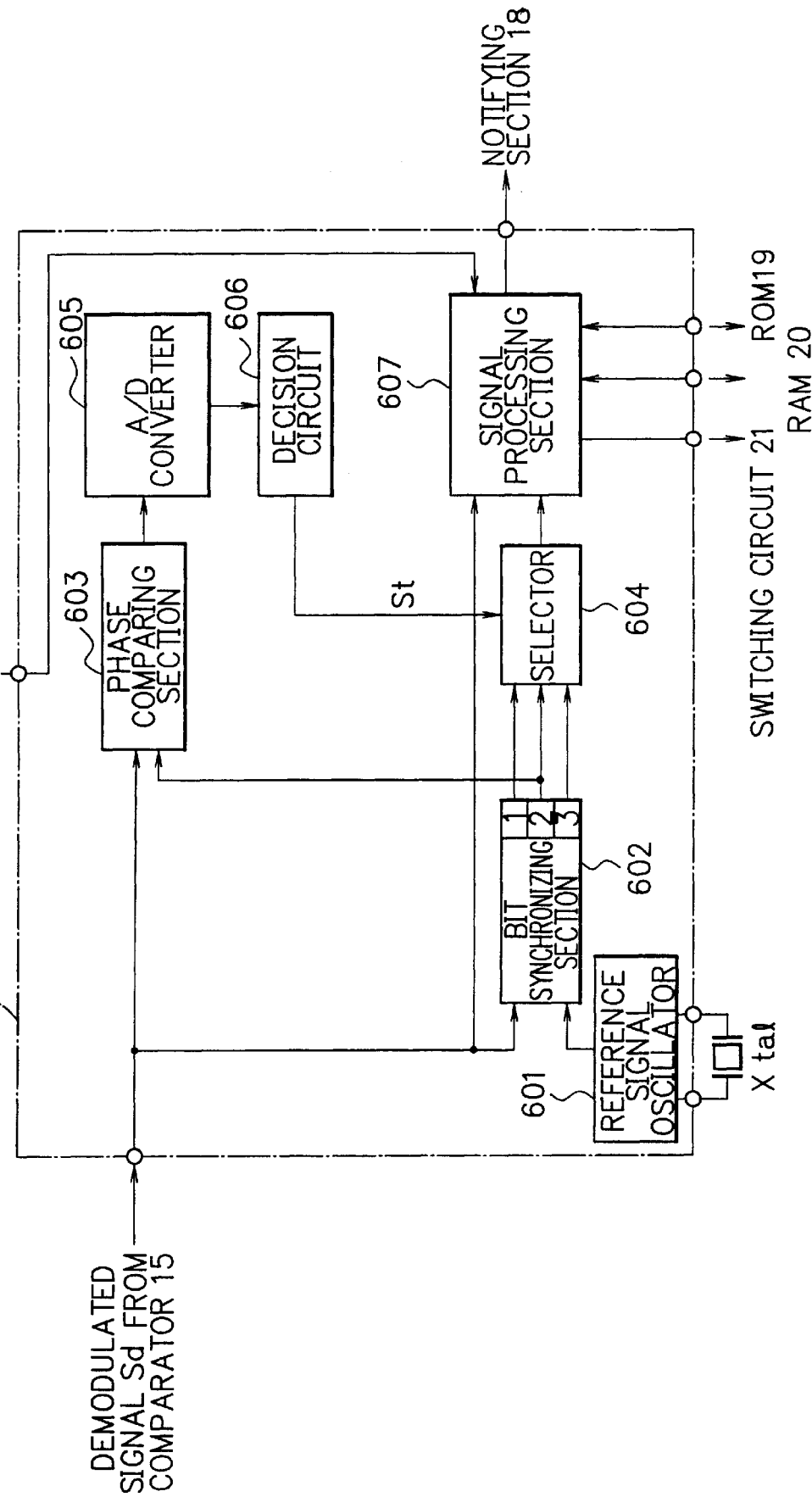
FIG. 3 is a block diagram showing a detailed structure of a decoder of the first embodiment.

FIG. 3 shows in a block diagram a detailed constitution of the decoder 16 of FIG. 2.

The decoder 16 includes a reference signal generator 601 including a crystal oscillator Xtal so as to generate a clock signal to be used as a reference signal and a bit synchronizing section 602 to output baud rate indication (baud rate clock) signals 1 to 3 respectively corresponding to, for example, baud rates of 512 bps (Abps), 1200 bps (Bbps), and 2400 bps (Cbps) of the POCSAG system.

Moreover, the decoder 16 includes a phase comparing section 603 to compare a phase of the demodulated signal Sd with a phase of the baud rate indication signal 1, 2, or 3 from the synchronizing section 602 to produce an output voltage V1, V2, or V3 corresponding to the baud rate Abps, Bbps, or Cbps of the received signal, an analog-to-digital (A/D) converter 605 to convert the output voltage V1, V2, or V3 from the phase comparing section 603 into a digital signal, and a decision circuit 606 to compare the output voltage in the digital form from the converter 605 with a decision voltage to thereby output a setting signal St corresponding to the baud rate Abps, Bbps, or Cbps of the received signal.

Additionally, the decoder 16 includes a selector 604 to selectively output the baud rate indication signal 1, 2, or 3 in association with the setting signal St sent from the decision circuit 606 in correspondence with the baud rate Abps, Bbps, or Cbps and a signal processing section 607 operative in response to the baud rate indication signal 1, 2, or 3 from the selector 604 to correlate a paging number (signal) in the received signal with a paging number beforehand stored in the ROM 19, to activate the notifying section 18, and to control the switching operation of the low-pass filter 14.

FIG. 4 shows in detail the configuration of the phase comparing section 603 of FIG. 3.

The comparing section 603 includes a phase comparator 801 which conducts a phase comparison between the demodulated signal Sd and the baud rate indication signal (reference signal) 1, 2, or 3 to thereby produce an output voltage V1, V2, or V3 in association with the baud rate 512 bps, 1200 bps, or 2400 bps.

The section 603 further includes a charge pump 802 to keep therein the output voltage V1, V2, or V3 from the comparator 801 so as to output the voltage therefrom, and a loop filter 803 to remove a high-frequency noise component from the output voltage from the pump 802.

Figure 5:
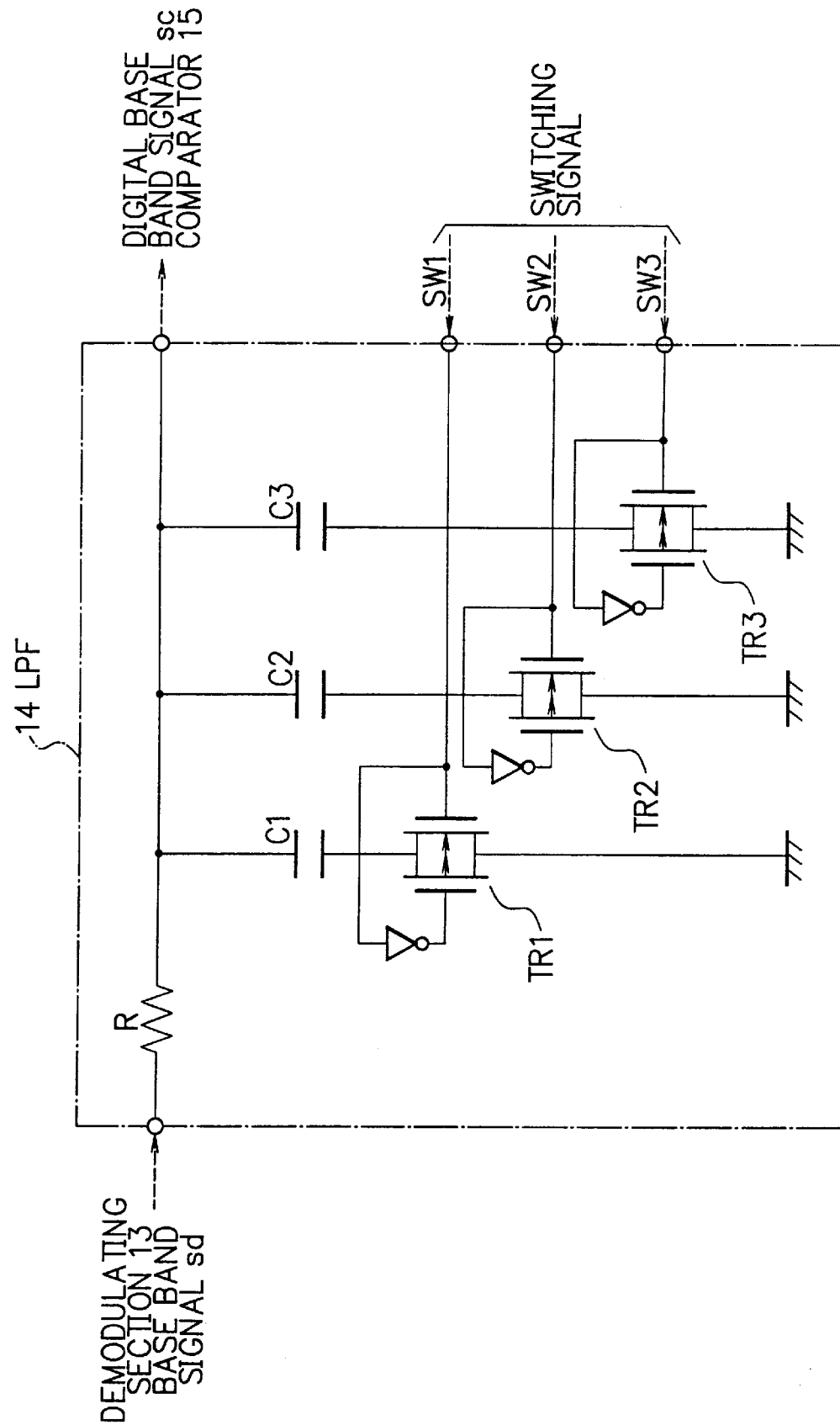
FIG. 5 is a block diagram showing in detail a configuration of a low-pass filter of the first embodiment.
Figure 6A:
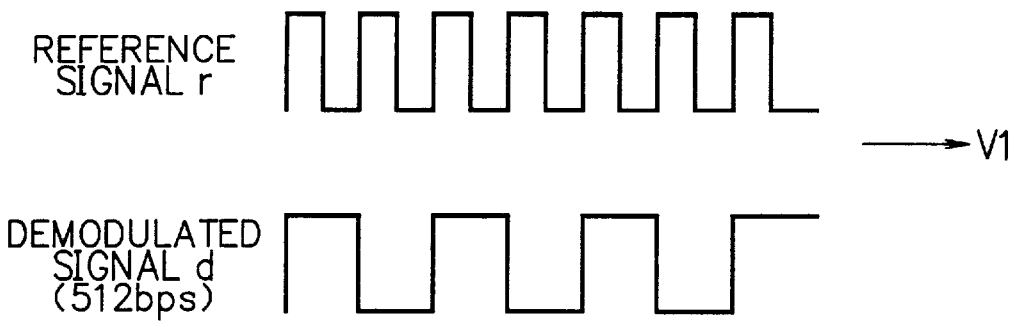
FIG. 6A is a diagram illustrating a waveform used in the operation of the decoder in the first embodiment.
Figure 6B:
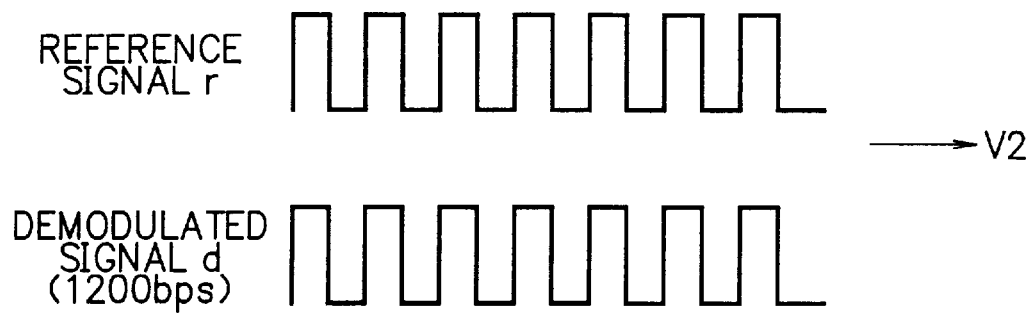
FIG. 6B is a diagram illustrating another waveform used in the operation of the decoder in the first embodiment.
Figure 6C:
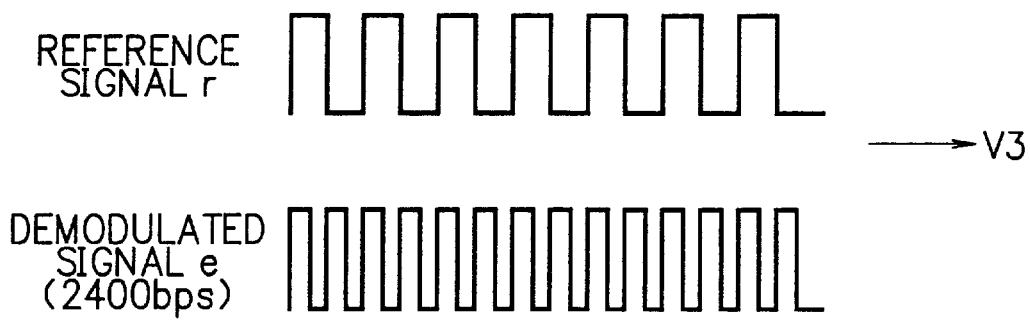
FIG. 6C is a diagram illustrating still another waveform used in the operation of the decoder in the first embodiment.
Figure 7:
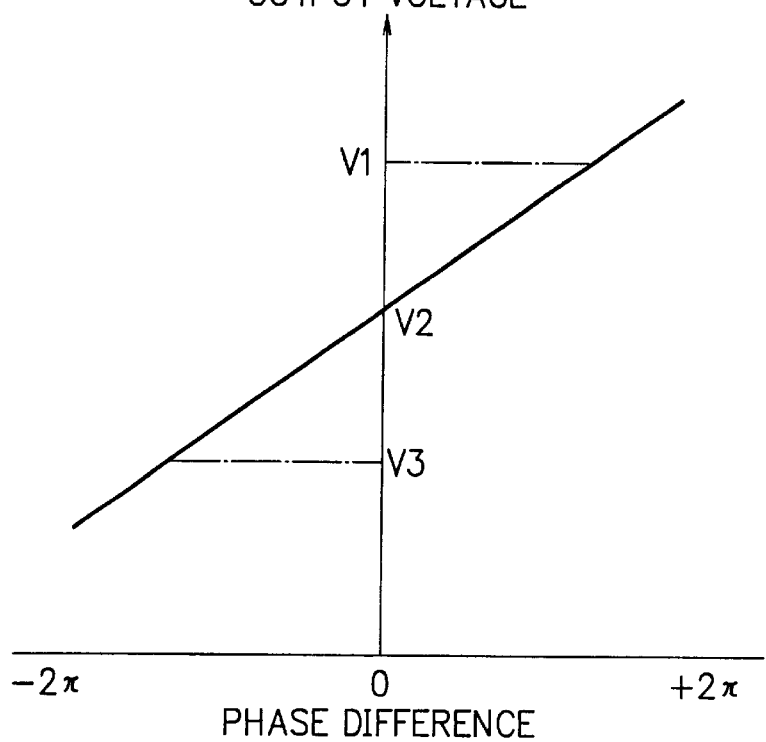
FIG. 7 is a graph for explaining operation of the phase comparing section of the first embodiment.

FIG. 5 shows in a block diagram a detailed structure of the low-pass filter 14 of FIG. 2.

The filter 14 is a low-pass filter having a resistor R on its input side. There is included a transistor switching circuit TR1 in which a capacitor C1 to set the cutoff frequency in combination with the resistor R to a value corresponding to 512 bps (Abps) is grounded in response to the switching signal SW1.

Furthermore, the filter 14 includes a transistor switching circuit TR2 in which a capacitor C2 to set the cutoff to a value corresponding to 1200 bps (Bbps) is grounded in response to the switching signal SW1. Similarly, there is disposed a transistor switching circuit TR3 in which a capacitor C3 to set the cutoff frequency to a value corresponding to 2400 bps (Cbps) is grounded in response to the switching signal SW1.

Subsequently, description will be given of operation of the first embodiment.

The antenna 11 receives a radio signal broadcast at a baud rate set by the transmission side, for example, 512, 1200, or 2400 (Abps, Bbps, or Cbps) of the POCSAG system. A signal Sa thus received is inputted from the antenna 11 to the radio section 12. The section 12 amplifies the signal Sa, conducts a frequency conversion through a mixing operation for the resultant signal Sa. and limits a band thereof to produce an intermediate frequency (IF) signal. The signal is then delivered to the demodulating section 13 to be demodulated into a base band signal Sb. The signal Sb is fed to the low-pass filter 14.

The filter 14 is set to a cutoff frequency to 512, 1200, or 2400 bps in association with the switching signal SW1, SW2, or SW3 in the band setting (limiting) operation. The filter 14 removes a high-frequency noise component from the signal Sb to improve a signal-to-noise (S/N) ratio thereof and resultantly sends a base band signal Sc to the comparator 15.

The shaping section 15 digitizes the signal Sc to thereby deliver a demodulated signal Sd to the decoder 16.

The decoder 16 compares a paging number in the demodulated signal Sd with a paging number pre-stored in the ROM 19. When the numbers match each other, the decoder 16 activates the notifying section 18 under control of the CPU 17 to notify the reception to the user by intermittently sounding a tone or by vibrating the pager.

In the operation, the decoder 16 automatically detects the baud rate Abps, Bbps, or Cbps of the signal Sa obtained by receiving the pertinent radio waveform and sets the cutoff frequency of the filter 14 to an appropriate value. Additionally, the decoder automatically sets the baud rate Abps, Bbps, or Cbps to the decoder 16 in relation to that set by the transmission side and then conducts the notification of the call to the user. The operation will now be described in more detail.

FIGS. 6A, 6B, 6C and 7 are explanatory diagrams respectively of operations of the decoder 16 and the phase comparing section 603.

In the decoder 16 shown in FIG. 3, the reference signal generator 601 produces and outputs a clock signal to the bit synchronizing section 602. Supplied from the comparator 15 to the bit synchronizing section 602, the phase comparing section 603, and the signal processing section 607 is a demodulated signal Sd corresponding to one of the baud rates Abps, Bbps, and Cbps set by the transmission side, the signal Sd having waveforms shown in FIGS. 6A, 6B, and 6C.

In this situation, the synchronizing section 602 feeds one of the baud rate indication signals 1 to 3 respectively corresponding to Abps, Bbps, and Cbps to the selector 604 and a reference r substantially identical to the baud rate indication signal 2 to the phase comparing section 603 at the same time.

In the phase comparing section 603 of FIG. 4, the phase comparator 801 conducts a phase comparison between the demodulated signal Sd and the reference signal r as shown in FIGS. 6A, 6B, 6C and FIG. 7. The comparator 801 transmits an output voltage V1 V2, or V3 to the charge pump 802 in association with the baud rate Abps, Bbps, or Cbps, and the loop filter 803 removes a noise component from the output voltage. The obtained output voltage is sent to the A/D converter 605 of FIG. 3.

The converter 605 converts the output voltage V1, V2, or V3 to a digital signal and sends the signal to the decision circuit 606. In this case, there exists a relationship of V1<V2<V3 among the output voltages.

Figure 8:
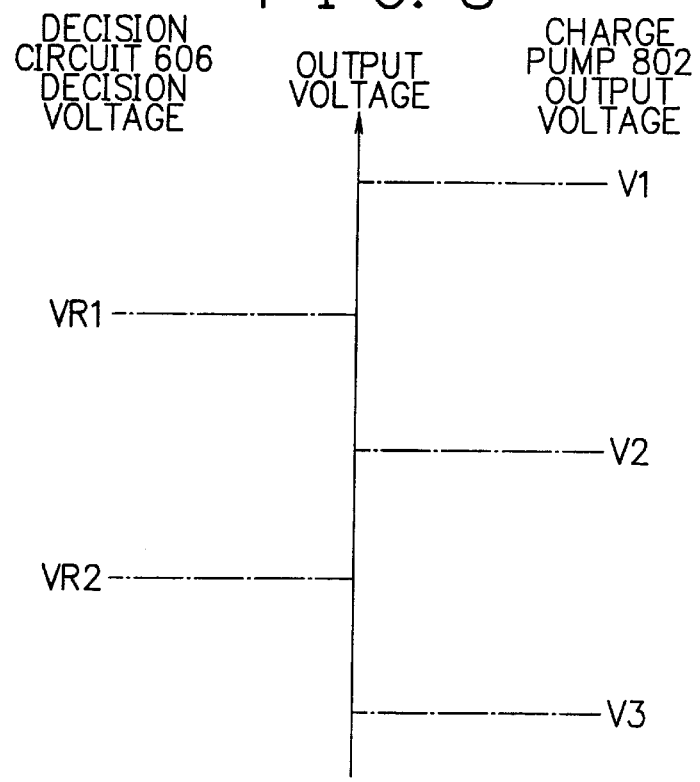
FIG. 8 is an explanatory diagram showing operation of the decision circuit in the first embodiment.

FIG. 8 is a diagram for explaining operation of the decision circuit 606.

When the output voltage V1, V2, or V3 takes a value between decision voltages VR1 and VR2 as shown in FIG. 8, the decision circuit 606 outputs the setting signal corresponding to baud rate Abps, Bbps, or Cbps to the selector 604. The selector 604 selectively outputs the baud rate indication signal 1, 2, or 3 from the bit synchronizing section 602 to the signal processing section 607 in association with the setting signal St.

The processing section 607 sets the operation corresponding to the signal 1, 2, or 3 from the selector 604 to execute processing thereof. Namely, the section 607 collates the received paging number (signal) with that pre-stored in the ROM 19, energizes the notifying section 18, and control the change-over operation of the cutoff frequency of the low-pass filter 14.

The filter 14 of FIG. 5 sets the cutoff frequency band thereof to match with baud rate Abps, Bbps, or Cbps corresponding to the switching signal SW1, SW2, or SW3 from the switching circuit 21. That is, the transistor switching circuit TR1 is turned on by the switching signal SW1 to resultantly ground the capacitor C1 such that the cutoff frequency is set to 512 bps by the combination of the capacitor C1 and the resistor R.

Similarly, the circuit TR2 is turned on or becomes conductive by the switching signal SW2 to thereby ground the capacitor C2 and hence the cutoff frequency is set to 1200 bps by the combination of the capacitor C2 and the resistor R. Moreover, the circuit TR3 is set to a conductive state by the switching signal SW3 to ground the capacitor C3. Consequently, the cutoff frequency is set to 2400 bps by the combination of the capacitor C3 and the resistor R.

Next, description will be given of a second embodiment in accordance with the present invention.

This embodiment varies in the baud rate detecting method from the first embodiment shown in FIG. 2.

Figure 9:
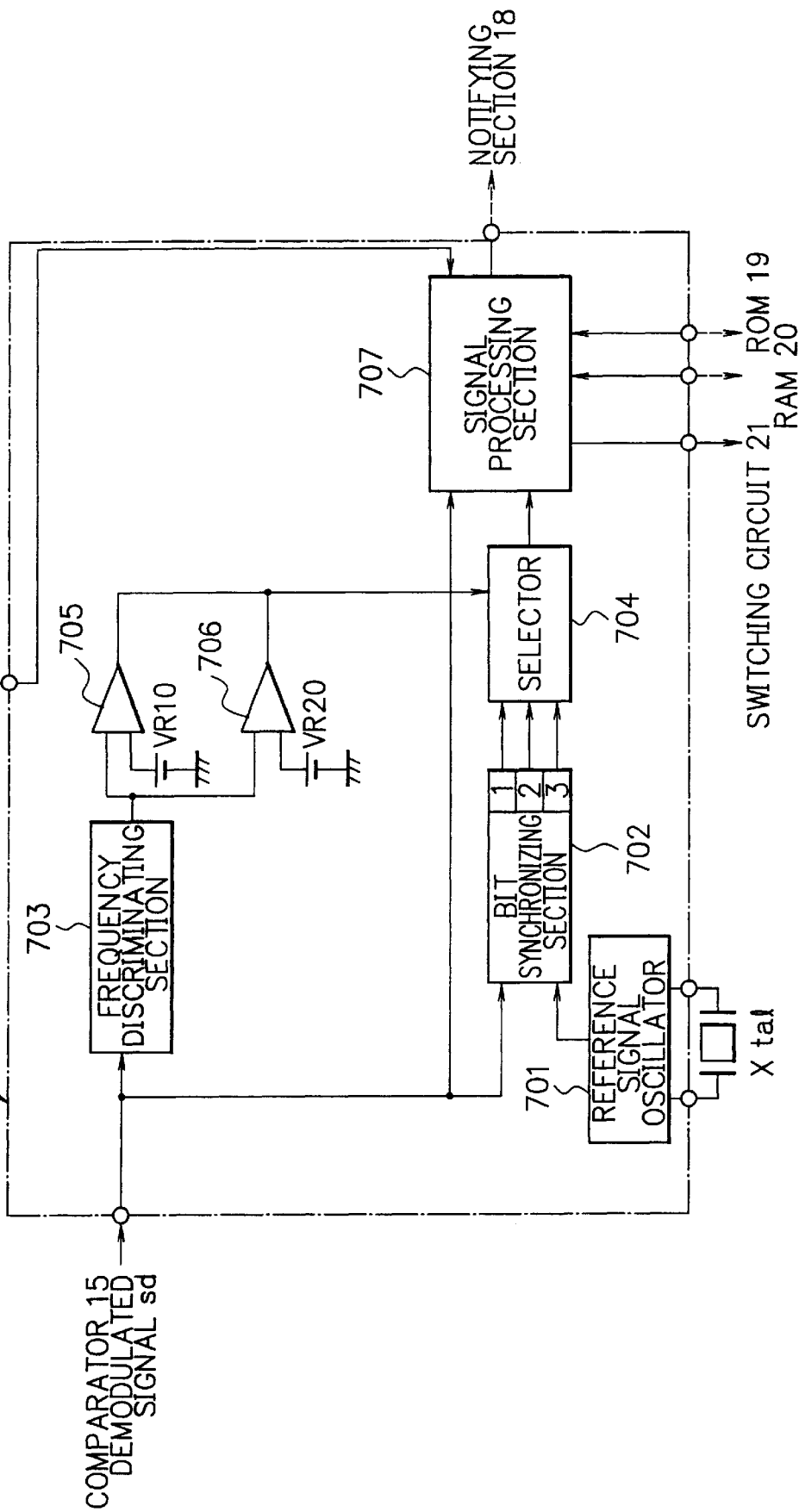
FIG. 9 is a schematic block diagram showing a configuration of the decoder in a second embodiment in accordance with the present invention.

FIG. 9 shows in a block diagram of the configuration of a decoder 16a of the second embodiment.

The decoder 16a includes a frequency discriminator 703 to produce, in accordance with the demodulated signal Sd, an output voltage V (V1 to V3) corresponding to one of the baud rates Abps, Bbps, and Cbps set by the transmission side as shown in FIG. 10. There are further included comparators 705 and 706 which compare the output voltage V1 V2, or V3 from the discriminator 703 respectively with decision voltages VR10 and VR20 to produce a setting signal St associated with the baud rate Abps, Bbps, or Cbps set by the transmission side.

Additionally, the decoder 16a includes a reference signal generator 701, a bit synchronizing section 702, a selector 704, and a signal processing section 707 which conduct operations similar to those of the associated components of the first embodiment.

Subsequently, description will be given of operation of the decoder 16a of the second embodiment.

Figure 11A:
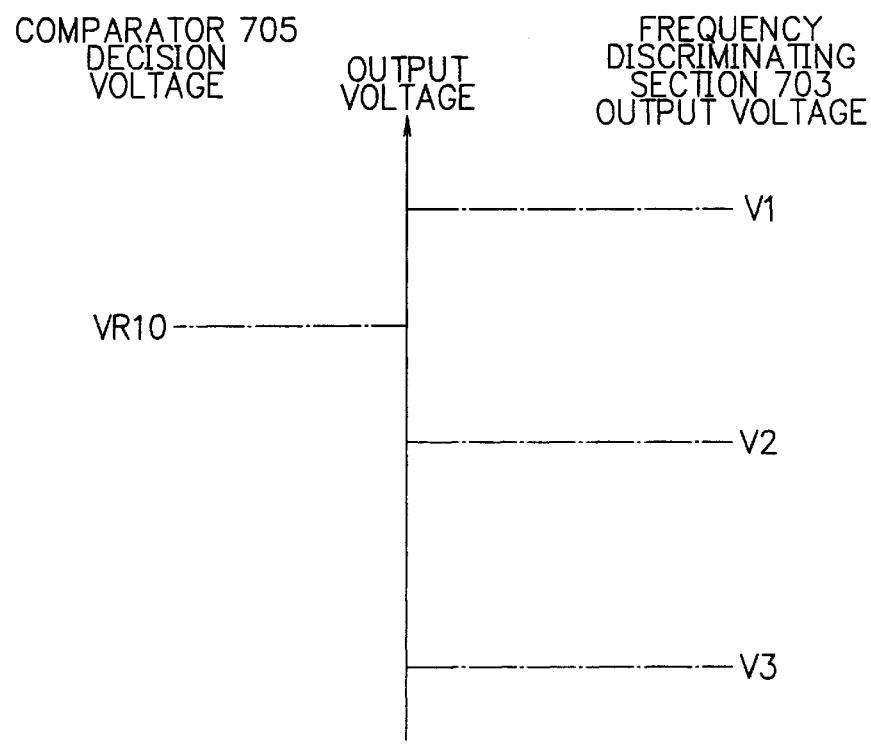
FIG. 11A is a diagram illustrating a relationship between a decision voltage (VR10) and an output voltage, for explaining an operation to determine a baud rate set by a transmission side in the second embodiment.
Figure 11B:
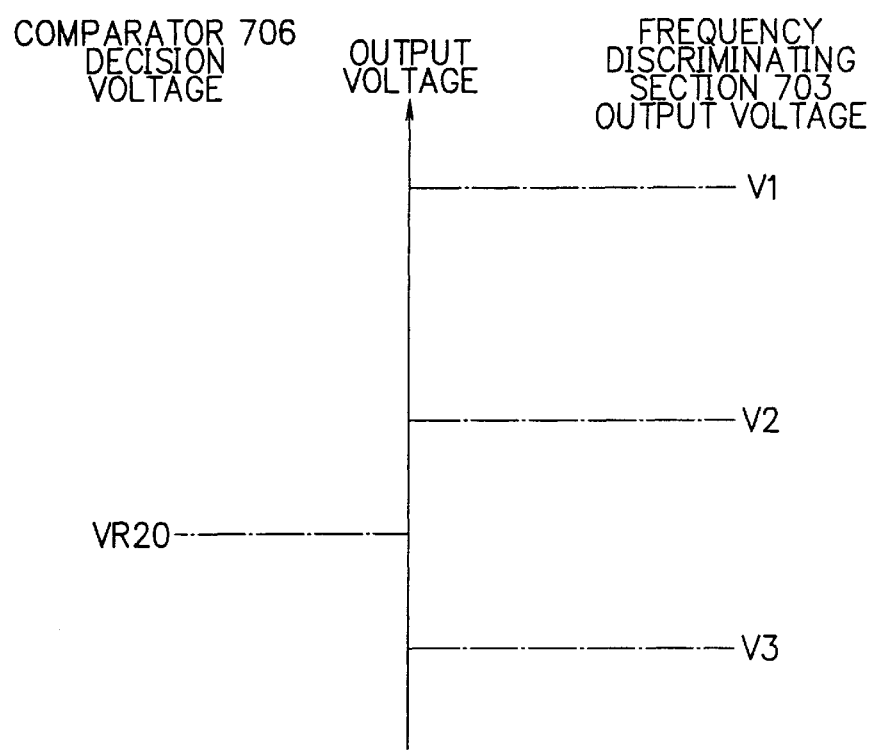
FIG. 11B is a diagram illustrating a relationship between a decision voltage (VR20) and an output voltage, for explaining an operation to determine a baud rate set by a transmission side in the second embodiment.

FIG. 10 is a graph for explaining output voltages produced in the operation of the decoder 16a. FIGS. 11A and 11B are graphic diagrams showing operations to determine to one of the baud rates Abps, Bbps, and Cbps set by the transmission side.

The demodulated signal Sd inputted to the discriminator 703 is transformed into a voltage, namely, there is obtained an output voltage V1, V2, or V3 of FIG. 10 corresponding to the baud rate Abps, Bbps, or Cbps set by the transmission side.

The output voltage from the discriminator 703 is delivered to the comparators 705 and 706. As can be seen from FIGS. 11A and 11B, two kinds of decision voltages VR10 and VR20 are set to the comparators 705 and 706 in advance. The decision voltages are compared with the output voltage from the discriminator such that a setting signal St corresponding to the baud rate Abps, Bbps, or Cbps set by the transmission side is outputted to the selector 704. After this point, the operations of the selector 704 and the signal processing section 707 are substantially the same as those of the decoder 16 of the first embodiment shown in FIG. 3.

Furthermore, this is also the case with the reference signal generator 701 and the bit synchronizing section 702. Moreover, the paging call receiving operation in other than the decoder 16a is substantially the same as that described in conjunction with FIG. 2.

As can be seen from the description above, the pager in accordance with the present invention receives a radio wave broadcast at one of a plurality of kinds of transmission speeds and automatically sets its paging operation to the transmission speed of the received signal.

Resultantly, it is possible to automatically select either one of the different kinds of transmission speeds for each service area or network provider. Thanks to this provision, the operation to produce pagers set to the respective transmission speeds can be dispensed with, which consequently improves productivity of the pagers. Moreover, even when the service area or the network provider in a service area is altered, it is not required to adjust the related pagers for the associated transmission speeds, which leads to improvement in usability and operability of the pagers.

In the pager in accordance with the sixth aspect of the present invention, a frequency discrimination (generation) is carried out for the demodulated signal to attain an output voltage corresponding to the transmission speed set by the transmission side. Moreover, the output voltage is compared with decision voltages to produce a setting signal associated with the transmission speed set by the transmission side. As a result, for example, the structure of the system is simplified when compared with a case in which the system conducts digital signal processing.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A pager for use with a radio paging network on which digital data is transmitted at one of a plurality of baud rates on a modulated broadcast radio wave, the pager comprising:
   a reception processing sub-system that produces a demodulated paging signal from an incoming broadcast radio wave and converts the demodulated paging signal to a digital data stream;
   a paging sub-system that processes the digital data stream to perform a paging operation, the paging subsystem including:
      a frequency detection circuit which directly measures the bit rate of the digital data stream to generate an identification signal representing the baud rate of the received paging data;
      an operating mode selection circuit which responds to the identification signal to set an operating mode for paging operations at the baud rate of the received paging data; and
      a signal processing section which responds to the digital data stream and the selected operating mode to conduct a paging operation when the paging number received as part of the data stream matches a pre-stored paging number identifying the pager.

2. A pager including a pager in accordance with claim 1, the pager being used in community with a POCSAG system.

3. A pager in accordance with claim 1, wherein the operating mode selection circuit includes a decision circuit which is responsive to the identification signal and which generates a decision signal representing the baud rate of the received paging data if the voltage of the identification signal is between predetermined limits corresponding to maximum and minimum values for the baud rate of the received paging data.

4. A pager in accordance with claim 3, wherein the reception processing sub-system includes a selective band limiting filter which filters the demodulated paging signal, the high-frequency cut-off of the filter being determined by the baud rate of the received paging data.

5. A pager in accordance with claim 3, wherein the reception processing sub-system includes:
   a radio section which amplifies a received broadcast radio wave signal and converts the received signal into an intermediate frequency signal;
   a demodulating section which demodulates the intermediate frequency signal;
   a low-pass filter which receives as an input thereto a demodulated base band signal from the demodulating section, the filter having a high-frequency cutoff set to the baud rate of the digital data stream in response to a switching signal; and
   a comparator which converts a signal output from the low-pass filter into a digital signal; and wherein the paging sub-system-system includes:
      a notifying section which announces reception of a signal directed to the pager;
      a decoder which receives as an input thereto the digital signal from the comparator, correlates a received paging number with a pre-stored paging number, activates the notifying section and transmits a switching signal to change the cutoff frequency of the low-pass filter; and
      a storage section which stores therein the paging number unique to the pager.

6. A pager in accordance with claim 3, wherein the frequency determination circuit is comprised of a phase comparator which compares the phase of the received paging data pulse stream with a reference signal to generate the identification signal.

7. A pager in accordance with claim 6, wherein the reference signal has a frequency corresponding to one of the possible baud rates for the received paging data.

8. A pager in accordance with claim 3, wherein the frequency determination circuit is comprised of a frequency discrimination circuit.

9. A pager in accordance with claim 1, wherein the reception processing sub-system includes a selective band limiting filter which filters the demodulated paging signal, the high-frequency cut-off of the filter being determined by the baud rate of the digital data stream.

10. A pager in accordance with claim 9, wherein the reception processing sub-system includes:
   a radio section which amplifies a received broadcast radio wave signal and converts the signal into an intermediate frequency signal;
   a demodulating section which demodulates the intermediate frequency signal;
   a low-pass filter which receives as an input thereto a demodulated base band signal from the demodulating section, the filter having a high-frequency cutoff set to the baud rate of the digital data stream in response to a switching signal; and
   a comparator which converts a signal output from the low-pass filter into a digital signal;
   a notifying section which announces reception of a signal directed to the pager;

a decoder which receives as an input thereto the digital signal from the comparator, correlates a received paging number with a pre-stored paging number, activates the notifying section and transmits a switching signal to change the cutoff frequency of the low-pass filter; and a storage section which stores therein the paging number unique to the pager.

11. A pager in accordance with claim 1, wherein the reception processing sub-system includes:

a radio section which amplifies a received broadcast radio wave signal and converts the received signal into an intermediate frequency signal;

a demodulating section which demodulates the intermediate frequency signal;

a low-pass filter which receives as an input thereto a demodulated base band signal from the demodulating section, the filter having a high-frequency cutoff set to the baud rate of the digital data stream in response to a switching signal; and a comparator which converts a signal output from the low-pass filter into a digital signal; and wherein the paging sub-system-system includes:

a notifying section which announces reception of a signal directed to the pager;

a decoder which receives as an input thereto the digital signal from the comparator, correlates a received paging number with a pre-stored paging number, activates the notifying section and transmits a switching signal to change the cutoff frequency of the low-pass filter; and a storage section which stores therein the paging number unique to the pager.

12. A pager in accordance with claim 11, wherein the low-pass filter is comprised of:

a resistor having a first terminal connected to the demodulated paging signal and a second terminal providing an output for the filter;

a plurality of shunt paths connected to the second resistor terminal, one shunt path being provided for each of the possible baud rates of the received paging data, each shunt path comprising a capacitor and a switching element, the switching element being operative in response to a control signal, to provide a signal path to ground through the associated capacitor from the second terminal of the resistor, the resulting resistance-capacitance circuits providing respective cut-off frequencies corresponding to each of the possible baud rates, and further including a control circuit for coupling a control signal to one of the switching elements in accordance with the baud rate of the received paging data.

13. A pager in accordance with claim 11, wherein the paging sub-system includes:

a reference signal generator which generates a clock signal as a reference of operation;

a bit synchronizing section which generates a baud rate indication signal corresponding to one of the possible baud rates;

a phase comparing section which compares the phase of the demodulated signal with a phase reference signal from the bit synchronizing section and transmits an output voltage corresponding to the baud rate of the received paging signal;

an analog-to-digital (A/D) converter for converting the output voltage from the phase comparing section into a digital signal;

a decision circuit which compares the output voltage from the A/D converter with a predetermined decision voltage and outputs a setting signal corresponding to the baud rate of the received signal;

a selector which selectively outputs a baud rate indication signal from the bit synchronizing section in response to the setting signal; and a signal processing section which correlates, in response to the baud rate indication signal from the selector, a received paging number with a pre-stored paging number activates the notifying section, and transmits a switching signal to change the cutoff frequency of the low-pass filter.

14. A pager in accordance with claim 13, wherein the phase comparing section includes:

a comparator which compares a phase of the demodulated signal with a phase of the baud rate indication signal and transmits an output voltage corresponding to the baud rate of the received signal;

a charge pump which keeps therein the output voltage produced from the comparator in correspondence with the bit rate and transmits the output voltage therefrom; and a loop filter which removes noise components from the output voltage from the charge pump.

15. A pager in accordance with claim 11, wherein the paging sub-system includes:

a frequency discriminator which transmits the demodulated signal as an output voltage corresponding to the bit rate of the paging signal;

a comparator which compares the output voltage from the frequency discriminator with a decision voltage and outputs a setting signal corresponding to the baud rate;

a selector which selectively outputs a baud rate indication signal from the bit synchronizing section in response to the setting signal; and signal processing section which correlates, in response to the baud rate indication signal from the selector, a received paging number with a pre-stored paging number, activates the notifying section, and transmits a switching signal to change the cutoff frequency of the low-pass filter.

16. A pager in accordance with claim 1, wherein the frequency determination circuit includes a phase comparator which compares the phase of the pulses in the received data stream with a reference signal.

17. A pager in accordance with claim 16, wherein the reference signal has a frequency corresponding to one of the possible baud rates for the received paging data.

18. A pager in accordance with claim 1, wherein the frequency determination circuit is comprised of a frequency discrimination circuit.

19. A pager in accordance with claim 1, further including a low-pass filter comprised of:

a resistor having a first terminal connected to the demodulated paging signal and a second terminal providing an output for the filter;

a plurality of shunt paths connected to the second resistor terminal, one shunt path being provided for each of the possible baud rates of the received paging data, each shunt path comprising a capacitor and a switching element, the switching element being operative in response to a control signal, to provide a signal path to ground through the associated capacitor from the second terminal of the resistor, the resulting resistance-capacitance circuits providing respective cut-off frequencies corresponding to each of the possible baud rates, and further including a control circuit for coupling a control signal to one of the switching elements in accordance with the baud rate of the digital data stream.

\* \* \* \* \*